Patented Feb. 18, 1936

2,031,475

UNITED STATES PATENT OFFICE 2,031,475

OXIDIZING CATALYSTS

Joseph C. W. Frazer, Baltimore, Md.

No Drawing. Application June 25, 1931,
Serial No. 546,928

7 Claims. (Cl. 23—2)

This invention relates to oxidation catalysts, and especially to such catalysts for use at elevated temperatures. While the invention is unlimited to any particular use, it has been found to be especially advantageous in the treatment of exhaust gases from internal combustion engines for effecting combustion of their combustible constituents, including carbon monoxide and other toxic gases, and is accordingly so described herein.

Catalysts used for the oxidation of carbon monoxide contained in the exhaust gases from internal combustion engines are subjected to extremely severe conditions of use. In addition to containing relatively large amounts of this toxic constituent these gases also contain large amounts of other combustibles, such as unburned gasoline and oil, and products resulting from their decomposition or partial combustion. They also contain water vapor. Experience has shown that it is not possible to selectively oxidize carbon monoxide in such gas mixtures, and that all of the combustibles are burned in completely converting the carbon monoxide to dioxide. In consequence very large amounts of heat are liberated in the catalytic combustion of the carbon monoxide in internal combustion engine exhaust gases. These gases also contain water vapor, and this together with oil and the like, generally tends to reduce the efficiency of catalysts. Therefore, to be effective for this purpose, the catalysts must be capable of continuous high activity at elevated temperatures, and in the presence of the materials referred to.

A further requirement of such catalysts is that they shall be capable of continuous and complete oxidation of the combustibles in these gases after being repeatedly cooled from and re-heated to such temperatures. That is, internal combustion engines usually are not operated continuously. For this reason the catalysts must be capable of efficient operation when used intermittently, i. e., each time the engine is run, whether such intermittent operation be of but a few minutes or of many hours duration.

In addition to the foregoing requirements, practical considerations render it desirable also that these catalysts possess a relatively low starting temperature, in order to avoid the use of accessory catalyst heating devices which would otherwise be necessary. Ideally the catalysts should be capable of initiating and continuing combustion of the combustible constituents in these gases upon being heated only by the gases supplied to them. For the same reason the starting temperature should remain constant, or substantially so, after long continued use, whether continuous or intermittent.

In my U. S. Patent No. 1,789,812, issued January 20, 1930, I have disclosed and claimed a method of treating these gases to eliminate their combustible constituents by subjecting them, admixed with oxygen, e. g. air, to the action of an artificially prepared chromite, and specifically iron chromite. Actual tests with automobiles have shown that the iron chromites disclosed therein operate satisfactorily in the manner described in the patent. It has been found, however, that after extended use their starting temperature is about 400° C., and therefore means other than the heat of the raw gases is needed to bring them to starting temperature. Hence, while they fully meet the main requirements of a catalyst for this use, and are accordingly fully operative and capable of satisfactory use, they lack the ancillary desideratum of continuously low starting temperature.

It is among the objects of the present invention to provide catalysts which are capable of effecting oxidation reactions, are adapted for sustained use at elevated temperatures and particularly for effecting complete oxidation of the combustible constituents of internal combustion engine exhaust gases, are inexpensive and easily prepared, highly active, capable of functioning in the presence of water vapor, remain efficient over long periods of time when used either continuously or intermittently, and which possess low and substantially constant starting temperatures.

A particular object is to provide a method of making catalysts of the type just referred to which is simple, readily performed, and is adapted to provide supported and non-supported catalysts.

The invention is predicated upon my discovery that oxygen compounds of copper and chromium in proportions corresponding substantially to copper chromites form highly active oxidizing catalysts embodying the stated objects, and further upon my discovery that such copper chromite catalysts may be prepared simply and readily by reduction of copper chromates. The catalysts contemplated by the invention possess low starting temperatures, which are not apparently increased through extended use, and which are low enough to adapt them to be heated sufficiently by internal combustion engine exhaust gases to cause them to function, without external heating. This characteristic, combined with their other properties, renders them especially suited for elimination of combustible constituents from exhaust gases of internal combustion engines.

Various copper chromites are embodied in the invention, and they may be made in various ways. For instance, a suitable catalyst may be prepared from a reaction product of copper hydroxide and chromic acid in proportions corresponding to copper chromate. I have found that copper hydroxide dissolves readily in aqueous solutions of chromic acid to form a solution of an oxygen compound of copper and chromium which upon being evaporated and heated is apparently converted to a catalytically active copper chromite. Apparently an acid copper chromate is formed, and this is then reduced to chromite, although I do not limit myself by this supposition. Copper carbonate may be used also, instead of the hydroxide.

The copper hydroxide or carbonate dissolves particularly readily if in a freshly precipitated condition. In the preferred embodiment the cupric compound is used, the chromite being formed by evaporation of the solution to dryness, and heating the residue, preferably by ignition at about 1000° to 1100° C. The dried residue is then broken up to provide granules of the copper chromite which may be used directly for catalytic purposes.

If preferred, supported catalysts may be prepared by immersing a suitable support in the chromate solution, and drying and heating the wetted support. A particularly suitable form of supported catalyst may thus be prepared by immersing a metallic screen in the solution, draining the excess solution therefrom, and heating the thus wetted screen. This provides the catalyst in the form of thin films which adhere tenaciously to the underlying metallic support.

As a specific example of the preparation of such chromites, there may be described the preparation of what appears to be cupric meta chromite. To this end, one mol of cupric hydroxide (or carbonate) is reacted with two mols of chromium trioxide in aqueous solution. For example, 296 grams of hydrated copper nitrate [Cu(NO$_3$)$_2$.6H$_2$O] dissolved in a large excess of water is precipitated with half-strength ammonia, and to the resultant suspension of cupric hydroxide there is added sufficient chromic anhydride preferably in concentrated aqueous solution, to form cupric chromate. Preferably the acid chromate, Cu(HCrO$_4$)$_2$, is formed, and accordingly a solution of 200 grams of chromic anhydride (CrO$_3$) in sufficient water to dissolve it is added to the copper hydroxide suspension. Upon vigorous stirring the copper hydroxide dissolves rapidly, forming a deep red solution, which is evaporated to dryness and heated, as described hereinabove.

Actual tests of copper chromite prepared in this manner has shown it to be a good oxidation catalyst, and to possess properties which make it a desirable catalyst for the treatment of internal combustion engine exhaust gases. Thus such gases passed through a bed of granules of the catalyst bring it up to starting temperature, and in the presence of oxygen it then begins to function at high efficiency. The gases being mixed with air in an amount at least corresponding to that theoretically necessary, the catalyst causes continuous complete combustion of all of the combustible constituents of the gases. Whether the engine be operated continuously over very long periods of time, or whether operated intermittently for long or short periods of time, the catalyst retains its efficiency, and always starts at approximately the same temperature. This shows it to be resistent to thermal influences, which is an essential of catalysts used at elevated temperatures.

Catalysts prepared by the solution procedure just described are thus satisfactory for use in treating exhaust gases. For this purpose, however, it is preferred, in general, to use copper chromite prepared by a precipitation procedure in which there is added to the chromate solution described hereinabove a further amount of copper compound, e. g. cupric hydroxide, to cause precipitation of what I believe to be normal copper chromate, Cu(CrO$_4$)$_2$. Upon being heated this compound is also converted to a catalytically active copper chromite which is substantially similar in its properties to that just described. This chromite has the added advantage that its starting temperature is materially lower than that of the chromite prepared by the solution procedure. I now believe that this precipitated chromate forms a basic chromite upon being heated.

In actual tests of these copper chromite catalysts all of the gases from a standard internal combustion engine were passed through a pipe about ⅞ inch in diameter containing a 3 inch length of copper chromite granules graded to about 6 to 10 mesh. The gases were mixed with about 30 percent of air before being passed over the catalyst, and temperature and carbon monoxide data were recorded automatically. The tests with the meta chromite made by the solution procedure showed that as soon as the catalyst reached about 280° C. the temperature in the catlyst bed, as measured by thermocouples, increased abruptly, showing that it had commenced to effect complete oxidation. Simultaneously, the carbon monoxide content of the effluent gas fell off to substantially zero. This indicates that the entire content of combustible constituents has been oxidized, as has been shown by extensive experiments. In general the temperature in the catalyst bed rose to and remained between 500° to 600° C., and the catalyst operated satisfactorily at all rates of flow up to about 15 liters of air-gas mixture per minute, this being the maximum flow rate tested. In one set of tests the engine was operated during periods varying in length from 1 to 20 hours, and after a total of 300 hours the catalyst was still functioning at 100 percent efficiency. Each time the engine was started the complete combustion of all of the combustible constituents in the gases began at approximately 280° C., as shown by the automatic recorder.

In a similar series of tests the basic chromite gave equally satisfactory results, the difference being that its starting temperature was about 250° C. Three hundred hours total use of this catalyst did not destroy this ability to start at this low temperature, and then to function perfectly.

These and other copper chromite catalysts embodied in the invention are capable not only of satisfactorily oxidizing all of the combustible and toxic constituents from internal combustion engine gases, during both continuous and intermittent operation thereof, but high temperatures apparently do not have any deleterious effect. For example, the chromites made by the solution procedure have been heated to 1150° C. without affecting their efficiency. Most catalysts are rendered useless for intermittent use after being subjected to such temperatures.

The catalysts described herein have been referred to as chromites, and the substances from which they are preferably formed as chromates, this terminology having been adopted for brevity of reference, and because of the manner in which the catalysts are made. It appears probable, for instance, that copper chromate is in fact formed when the copper hydroxide dissolves or reacts with the chromic acid, and that upon being heated this is reduced to a chromite. Thus in the solution procedure described the cupric acid chromate probably breaks down to form a chromite which corresponds to the empirical formula $CuO.Cr_2O_3$ or $Cu(CrO_2)_2$, while that referred to as basic chromite is probably $(CuO)_2.Cr_2O_3$.

Furthermore, my tests have shown that when the proportions of materials used are varied substantially from those adapted to form a chromate, and ultimately a chromite, the resultant material is not as good a catalyst as when the product conforms substantially to chromite proportions. Moreover, tests of mechanical mixtures of the oxides constituting the supposed chromite in proportions corresponding thereto have shown them to be inferior and incapable of the results obtained by the catalysts prepared in a manner adapted to produce a chromite. In view of all of these facts, it appears probable that the catalysts are actually chemical combinations of oxygen compounds of copper and chromium, and probably chromites. It will be understood, however, that they may be other than the compounds named, and that the materials from which they are formed may not be chromates, but that these terms refer to the products of the type and embodying the characteristics described, whatever be their actual chemical nature.

As has been noted, the chromites may be made from copper compounds other than the hydroxide. Therefore the term "copper hydroxide" used in the claims is to be understood as comprehending such compounds, that term being used for conciseness of reference, and not as restrictive to the hydroxide.

It has been found also that the copper chromites may be caused to start functioning more rapidly if they are preliminarily treated with a reducing atmosphere, e. g. the raw exhaust gases, unmixed with oxygen, or containing oxygen in an amount insufficient to effect complete combustion. The most suitable means of doing this is to mix the gases flowing to the catalyst with an insufficient amount of air for complete combustion, the balance of the air needed being introduced farther along the catalyst bed. The effect of this reducing treatment, as shown by tests which have been made, is to lower, or depress, the starting temperature, thus causing the catalyst to effect oxidation more rapidly than when not so treated. The tests showed that the starting temperature of the meta chromite is thus lowered to about 225° C., and that of the basic chromite to about 150° C. While this modification is not necessary for most purposes, the catalysts functioning satisfactorily in the manner described hereinabove, it may be used for special circumstances.

The ease of production, cheapness, ability to remain active at high temperatures for long periods of time, and to function efficiently after repeated heating and cooling, adapt the catalysts provided by the invention particularly for use in the treatment of internal combustion engine exhaust gases, as will be evident from what has been said hereinbefore. However, they are equally applicable for other purposes where an oxidation catalyst is needed, for example in the conversion of sulfur dioxide to sulfur trioxide. Likewise, the copper chromites provided by this invention have been found to be especially valuable catalysts for surface combustion processes. Other applications will suggest themselves to those skilled in the art.

This application is a continuation in part of my copending application Serial No. 538,003, filed May 16, 1931.

According to the provisions of the patent statutes, I have explained the principle of my invention, and have described what I now consider to represent its best embodiment. However, I desire to have it understood that, within the scope of the appended claims, the invention may be practiced otherwise than as specifically described.

I claim:

1. A method of continuously and completely oxidizing carbon monoxide comprising passing a stream of carbon monoxide and oxygen into contact with a catalyst comprising artificially prepared copper chromite.

2. A method of continuously and completely oxidizing carbon monoxide comprising passing a stream of carbon monoxide and oxygen into contact with a catalyst comprising artificially prepared cupric chromite heated to a temperature above about 250° C.

3. A method of continuously and completely oxidizing carbon monoxide comprising passing a stream of carbon monoxide and oxygen into contact with a catalyst comprising artificially prepared oxygen compound of copper and chromium corresponding to the empirical formula $CuO.Cr_2O_3$ heated to a temperature above about 250° C.

4. A method of continuously and completely oxidizing carbon monoxide comprising passing a stream of carbon monoxide and oxygen into contact with a catalyst comprising artificially prepared oxygen compound of copper and chromium corresponding to the empirical formula $(CuO)_2.Cr_2O_3$.

5. A method of continuously and completely oxidizing carbon monoxide comprising passing a stream of carbon monoxide and oxygen into contact with a catalyst comprising copper chromite prepared by dissolving a soluble compound of copper in chromic acid solution in proportions adapted to form copper chromate, and heating the product to form copper chromite catalyst, the catalyst being heated to a temperature above about 250° C.

6. A method of continuously and completely oxidizing carbon monoxide comprising passing a stream of carbon monoxide and oxygen into contact with a catalyst comprising an oxygen compound of copper and chromium prepared by reacting cupric hydroxide with chromic acid solution to precipitate cupric chromate and heating said chromate to convert it to chromite catalyst, the catalyst being heated to above about 250° C.

7. A method of continuously and completely oxidizing the combustible constituents of internal combustion engine exhaust gases during intermittent operation of the engine, comprising passing the gases in a substantially uncooled condition together with air sufficient for said oxidation, into contact with the catalyst comprising artificially prepared copper chromite.

JOSEPH C. W. FRAZER.